United States Patent [19]

Veronesi et al.

[11] Patent Number: 5,041,856

[45] Date of Patent: * Aug. 20, 1991

[54] IN-LINE METALLIC DEBRIS PARTICLE DETECTION PROBE AND RESONANT EVALUATION SYSTEM UTILIZING THE SAME

[75] Inventors: William A. Veronesi, Glastonbury; Andrew P. Weise, Columbia; Robert W. Reed, South Windsor; Harry I. Ringermacher, West Hartford, all of Conn.

[73] Assignee: United Technologies Corporation, Hartford, Conn.

[*] Notice: The portion of the term of this patent subsequent to May 15, 2007 has been disclaimed.

[21] Appl. No.: 455,103

[22] Filed: Dec. 22, 1989

Related U.S. Application Data

[63] Continuation-in-part of Ser. No. 290,531, Dec. 27, 1988, Pat. No. 4,926,120.

[51] Int. Cl.$^5$ .................... G01N 27/74; G01N 33/28; G01R 33/10; G08B 21/00
[52] U.S. Cl. .................................... 324/204; 324/226; 324/236; 73/64; 340/641
[58] Field of Search ............... 324/204, 233, 316, 226, 324/236; 73/10, 861.08, 861.11, 64; 340/631

[56] References Cited

U.S. PATENT DOCUMENTS 4,504,788 3/1985 Froncisz et al. .................... 324/316
4,926,120 5/1990 Veronesi .............................. 324/204

Primary Examiner—Walter E. Snow
Attorney, Agent, or Firm—Peter R. Ruzek

[57] ABSTRACT

An arrangement for detecting metallic particles carried by a fluid includes a metallic probe member which surrounds an elongated passage through which the fluid flows and which is constituted by a split tube having two marginal portions delimiting a gap which extends along said passage and completely separates the marginal portions from one another. Capacitors are arranged at the gap and alternating electric current is caused to flow in the probe member around the passage so that the probe member and the capacitors form a tank circuit having resonance characteristics that are influenced by any inclusion then present in the passage in a manner dependent on the electromagnetic properties of the inclusion. The character of any metallic particle then present in the passage is determined from variations in the alternating electric current that reflect the influence of such metallic particle on the resonance characteristics.

14 Claims, 2 Drawing Sheets

IN-LINE METALLIC DEBRIS PARTICLE DETECTION PROBE AND RESONANT EVALUATION SYSTEM UTILIZING THE SAME

This application is a continuation-in-part of U.S. patent application Ser. No. 07/290,531 filed Dec. 27, 1988, now U.S. Pat. No. 4,926,120.

DESCRIPTION

1. Technical Field

The present invention relates to particle detection in general, and more particularly to arrangements for detecting metallic particles carried by a fluid, especially lubricating oil or fuel for gas turbine engine applications.

2. Background Art

There are already known various constructions of detecting arrangements capable of detecting the presence of metallic particles in a flow of a fluid. The traditional approach to detecting the presence of metallic particles in flowing fluid systems has been the use of magnetic plugs that are exposed to the fluid flow and attract and capture ferromagnetic fluid borne particles. In the simplest embodiment of this approach, the plug must be periodically removed from the system and inspected for the presence of ferromagnetic debris thereon. Presence of material of this type in the flowing fluid has been found to be correlated with the overall health of the system and, therefore, the number and sizes of the ferromagnetic particles that have been scavenged from the fluid and magnetically captured by the plug over a given period of time provide an indication of such health. In particular, this approach provides information on the degradation of bearing and/or gear components prior to the onset of occurrence of catastrophic failure of such components.

While the magnetic plug approach has been found to provide the capability of detecting debris particles in flowing fluid systems, it provides only a partial and less than satisfactory solution to the system health monitoring problem. Specifically, the magnetic plug must be removed from the system and visually inspected in order to detect ferromagnetic debris buildup. This has the significant disadvantage that potential component distress problems occurring between two successive magnetic plug inspections may go completely undetected until it may be too late, with substantial or even catastrophic failure of the affected component taking place prior to the time scheduled for the next inspection. Secondly, in order to perform the inspection of the magnetic plug, it is necessary to disturb the integrity of the system being monitored. This is known to have had catastrophic consequences in several cases. Additionally, the magnetic capture efficiency of the plug is less than 100% and it varies with debris particle size and is affected by flow velocity. Moreover, since a magnetic capture approach is being used, only ferromagnetic debris can be detected.

To avoid at least some of the aforementioned drawbacks, further developments have been pursued in this area to improve the debris particle detection in fluid flows, resulting in advanced magnetic plug designs. One of such developments has been to provide the magnetic plugs with open electrical gaps that are electrically bridged and shorted following the buildup of a significant amount of the debris material on such plugs. This was intended to reduce or even eliminate the need for visual inspection and to provide continuous monitoring of the health of the fluid system. While constituting an advancement over the original magnetic plug detectors, such electrical gap systems still suffer from certain major shortcomings. Notably, since such systems still employ magnetic capture, they are capable of detecting only ferromagnetic debris. A further, and an even greater, drawback of such systems is that the magnetic plugs preferentially scavenge small submicron debris material from the flowing fluid, due to the lower momentum or inertia associated with small particles. Yet, the submicron debris is not symptomatic of an unhealthy situation or of component distress; rather, it is a naturally occurring phenomenon associated with normal wear encountered in any mechanical system in which components rotate or are otherwise displaced relative to one another in physical contact with each other. As a consequence, the magnetic plug systems employing the electric gap shorting concept for detection are prone to extremely high false alarm rates. So serious has this latter problem been found to be that it is currently a common practice not to electrically connect the electric gap arrangement, thus forfeiting its advantages, and to revert once more to reliance merely on the magnetic capture feature coupled with visual inspection.

Yet, the value of monitoring the health of equipment employing flowing fluid lubrication and/or fuel supply systems on the basis of the characteristic properties of the debris carried by such fluids has been clearly recognized industry-wide. This recognition has spurred interest in the development of inductive debris detecting systems for this purpose. The advantages of the inductive detection approach include a continuous in-line monitoring capability and the ability, in principle, of detecting not only ferromagnetic, but also non-ferromagnetic, metallic particles. While inductive debris detecting systems using multiturn coils surrounding a passage through which a fluid to be monitored flows and supplied with alternating current represent an advance over the aforementioned approach employing magnetic plug detectors, they still possess a fundamental shortcoming, namely that, because of the nature of the coil design employed therein, the coil and its associated resonant bridge circuitry are sensitive not only to the eddy current flow produced in the debris particle, which is the fundamental mechanism utilized in inductive debris particle detection, but also to changes in the dielectric constant of the fluid flowing through the detection region of the coil. This sensitivity to the dielectric constant of the fluid and to changes therein results in a high rate of false indications. A reason for this is that what is commonly found in oil lubrication systems is not only oil and debris particles carried thereby but also foam and small and even large entrapped air bubbles. Typical extent of entrapment of large bubbles (i.e. bubbles having diameters equal to the flow tube diameter) in the flow can amount to upwards of 50% of the total flow. Furthermore, finely suspended dirt clouds and other substances, such as water, are also frequently found in lubrication system fluid flows. The presence of any or all of these types of inclusions in the flowing fluid leads to large changes in the dielectric constant of the fluid which, in turn, are perceived by the inductive detecting systems sensitive thereto and thereby adversely affect the accuracy of the indications provided by such systems.

An attempt to avoid this problem caused by entrapped air bubbles and other dielectric inclusions is presented in the British patent No. 1,348,881, where a radio frequency bridge circuit is employed in conjunction with a pair of multi-turn induction coils for detecting the presence of fluid borne debris particles. In the system of the above patent, the flow of the fluid is split into two parallel paths each passing through one of the induction coils. The theory behind this approach was that large air bubbles, for instance, would be evenly split between the two parallel flow paths, thus leading to a signal of a similar magnitude in each of the coils; in contrast, a metallic fluid-borne debris particle would only be carried in one of the paths, thus resulting in a signal only from the coil surrounding this particular path. This then was supposed to provide a mechanism for differentiating between these two effects, that is that of the entrapped air bubbles, on the one hand, and that of the metallic debris particles, on the other hand. However, experience has shown that, the nature of things being what it is, the air bubbles and similar dielectric inclusions are not evenly split between the two paths in the real world, which results in a signal level in one leg of the bridge circuit exceeding that in the other leg even if only dielectric inclusions and no metallic particles pass through either one of the parallel paths, thus giving a false indication indistinguishable from that attending the passage of a metallic particle through this detection system.

Other attempts have been made as well to eliminate the air bubble sensitivity problem by employing pairs of split parallel path coils spaced in the flow direction. Notwithstanding the complexity of the arrangements of this type, even this approach has not resulted in an unqualified success, as evidenced by the lack of acceptance of arrangements of this type in the marketplace.

A subsequent development in this field is reflected in the British patent application No. 2,101,330 A, published on Jan. 12, 1983, which discloses a system for detecting particles in flowing fluids utilizing two inductive coils that are spaced from one another along a section of the path of flow of the fluid and each of which surrounds a portion of this detecting path section. As ferromagnetic particles and other inclusions entrained in the fluid pass through the detecting path section, they cause changes in the electrical impedance of such coils and these changes are then evaluated. The coils and the evaluating circuitry together constitute a detector arrangement which is supposed, in principle, to eliminate the false signal indications generated in response to the passage of dielectric non-uniformities through the detecting path section, by limiting the detection capability of the system to a selected phase angle thereby to screen out the influence of gas bubble discontinuities. Unfortunately, this also led to the loss of capability on the part of this system to detect non-ferromagnetic particles, thus rendering this system, despite its high complexity, not significantly better than those employing the magnetic plug approach Moreover, in practice, the inductive debris detecting system of this type still suffers from a high false-alarm rate because the gas bubbles do not generate exactly the same response in each of the two coils. This is at least partially attributable to the pulsating nature of the flows typically encountered in lubricating systems.

A current adaptation of this latter approach is the Sensys/Ferroscan technology; however it also suffers of the disadvantages discussed just above. Other developments have resulted in new approaches to magnetic capture systems. The most noteworthy of these approaches is that employed in the quantitative debris monitor system manufactured by the Tedeco Corporation; however, while this system employs a variation of the magnetic capture technique, it still has the drawback of reacting to gas bubbles because its detection means is also sensitive to dielectric constant changes in the flowing fluid background medium. To deal with this problem, a new air bubble separator system (marketed by the Tedeco Corporation under the trade name or trademark Lubriclone) has been developed, as described in an article by F. DiPasquale entitled "Field Experience with Quantitative Debris Monitoring" (SAE Paper No. 871736, Oct. 5–8, 1987), to remove air bubbles from the fluid flowing to the quantitative debris monitor of the above type. Yet, the complexity, size penalty, cost penalty, and low effectiveness of such an approach more than offset its benefits.

Accordingly, it is a general object of the present invention to provide an inductive type debris detection and/or monitoring system which avoids the disadvantages of the previously proposed systems of both the magnetic and the inductive type.

More particularly, it is an object of the present invention to develop an inductive particle detection system which is insensitive to temperature changes, to changes in the dielectric properties of the flowing medium, and to overall system vibrations.

Still another object of the present invention is to design the inductive particle detection system of the type here under consideration in such a manner as to be able to determine, on an individual particle basis, both the size and the magnetic or non-magnetic character of fluid-borne metallic debris particles.

It is yet another object of the present invention to devise an inductive particle detection system of the above type which is non-intrusive to the flow system, thus causing no additional flow resistance.

Yet another object of the present invention is to provide an inductive debris particle detection system that is insensitive to naturally occurring submicron wear debris particles.

A concomitant object of the present invention is to develop an inductive debris monitoring and/or detection system arrangement of the above type which is relatively simple in construction, inexpensive to manufacture, easy to use, and yet reliable in operation.

DISCLOSURE OF THE INVENTION

In pursuance of these object and others that will become apparent hereafter, one aspect of the present invention resides in a probe for use in detecting individual metallic particles carried by a fluid continuously flowing in an elongated passage and including an inductive coil surrounding the passage. According to the invention, the inductive coil is electrically configured as a single-turn electric conductor which has a length as considered in the longitudinal direction of the passage that at least equals the diameter of the conductor and has a gap extending over the entire length of the conductor and physically separating two longitudinally extending marginal portions of the conductor from one another. Capacitor means is situated directly at the gap, is electrically connected between the marginal portions of the conductor and is isolated from the passage.

BRIEF DESCRIPTION OF THE DRAWING

The present invention will be described in more detail below with reference to the accompanying drawing in which.

BEST MODE FOR CARRYING OUT THE INVENTION

Figure 1:
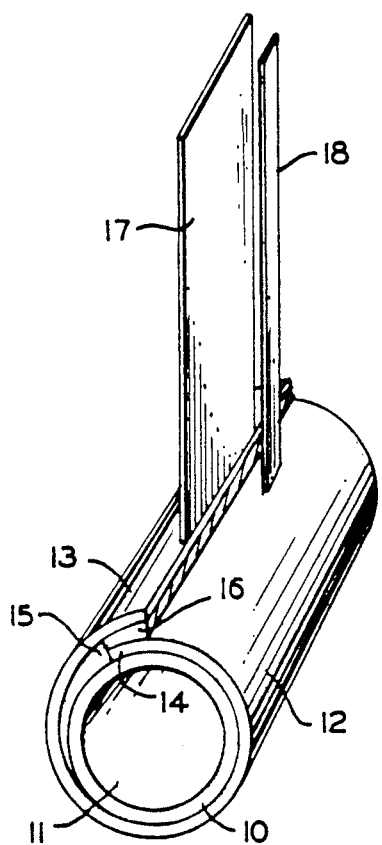
FIG. 1 is a perspective view of an arrangement of the present invention for detecting the presence and character of metallic particles in a flowing fluid.

Referring now to the drawing in detail, and first to FIG. 1 thereof, it may be seen that the reference numeral 10 has been used therein to identify a tubular probe housing or pipe section. The pipe section 10, which is of a non-conducting unity magnetic permeability material, bounds a passage 11 for the flow therethrough of a fluid that is to be examined for the presence therein of various inclusions, such as magnetic and non-magnetic metallic particles.

A probe member 12 of a highly electrically conductive material, such as copper, is arranged in such a manner as to be stationary relative to the pipe 10 and to circumferentially surround the passage 11. For instance, the probe member 12 may be embedded or potted in, or arranged around, the pipe section 10. The probe member 12 is constituted by a single turn coil and it has respective marginal portions 13 and 14 which bound a gap 15 with one another. The probe member 12 should have an axial length to diameter ratio greater than one. So, for instance, the axial length of the probe 12 may be 1-⅛" and its diameter about 0.71", and it may be made of a 3 mil thick copper sheet. It will be appreciated, though, that the above dimensions, while they have been carefully chosen for a particular construction of the detecting arrangement of the present invention, may be altered without departing from the present invention, so long as the altered dimensions satisfy the operating criteria that will be discussed below.

Figure 4:
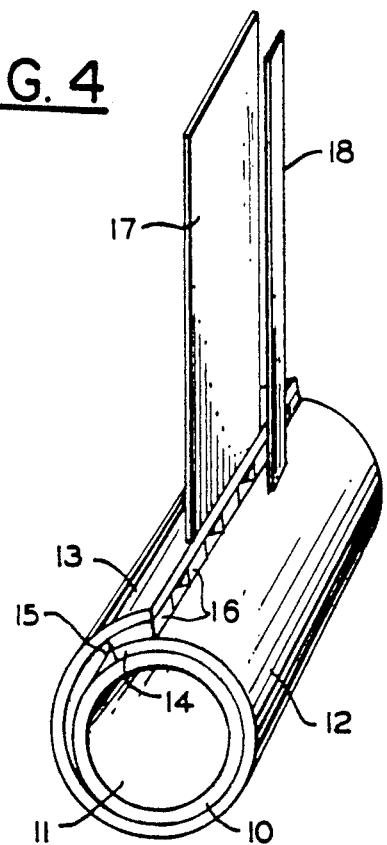
FIG. 4 is a view similar to that of FIG. 1 but diagrammatically depicting a modified capacitor arrangement.

In the probe member construction illustrated in FIG. 1, the marginal portions 13 and 14 overlap one another, and a capacitor arrangement 16 is interposed in the gap 15 that is situated between the overlapping regions of the marginal portions 13 and 14. As illustrated, the capacitor arrangement 16 includes merely a layer or slab of dielectric material, so that the overlapping regions of the marginal portions 13 and 14 constitute respective capacitor plates. However, more often than not, the surface areas of the overlapping regions of the marginal portions 13 and 14 are insufficient to provide the required capacitance. In such a case, in accordance with the present invention, the capacitor arrangement 16 may be constituted by a single multilayer capacitor device 16, or preferably as shown in FIG. 4 by a number of such multilayer devices which are distributed at predetermined, such as substantially identical, intervals along the gap 15 between the overlapping regions of the marginal portions 13 and 14 of the probe member 12. In any event, the capacitor arrangement 15 is situated at the gap 15 and is isolated from the passage 11.

As further shown in FIGS. 1 and F of the drawing, the marginal portions 13 and 14 have respective electric leads 17 and 18 connected to them. The electric leads 17 and 18 serve to supply alternating electric current to the marginal portions 13 and 14. When this occurs, the probe member 12 forms a parallel tank circuit with the capacitor arrangement 16.

In accordance with the present invention, the capacitance of the capacitor arrangement 16 has a relatively high value. The value of this capacitance is chosen in such a manner with respect to the inductance of the probe member 12 as to achieve an inductance to capacitance ratio on the order of one to 4 or even less. The probe member 12 and the capacitor arrangement 15 form a resonator that is operated at resonance, as will be discussed in more detail later. The resonance characteristics of this resonator are influenced by the electromagnetic properties of inclusions present in the passage 11.

Because of the elongated single turn coil configuration of the probe member 12 and the location of the capacitor arrangement 16 at the gap 15, that is, as close as physically possible to the marginal portions 13 and 14, this tank circuit has a high Q factor. It will be appreciated that important criteria to be considered when altering the dimensions of the probe member 12 (and/or the capacitance of the capacitor arrangement 16) include the preservation of this high Q factor, the preservation of uniformity of the magnetic field in the central probe passage region, and the maintenance of a low inductance to capacitance ratio.

Two major advantages are obtained when the resonator or tank circuit constituted by the probe member 12 and the capacitor arrangement 16 are constructed in the above-discussed manner for the detection of metallic debris in fluid flow systems. First, the thus obtained resonator has a very high quality factor, which means that the effective electrical impedance of such a resonator is greatly affected by even relatively small perturbations in the characteristic properties of the fluid present in the passage 11, as caused by entrained inclusions. This high sensitivity renders possible the detection of minute metallic particles then present in the passage 11.

However, the thus obtained high sensitivity to the electromagnetic characteristics of inclusions is not sufficient when it is desired to construct a fully operational and reliable system for detecting fluid-borne debris. This is so because, as will now be explained in connection with a lubrication system with a liquid lubricant, such as oil, that is being recirculated, without being limited to this particular fluid, the contents of any passage in a typical lubrication system varies with time between the extremes of substantially none of the lubricant to substantially all lubricant while the system is in operation. Lubricants typically have a dielectric constant on the order of three relative to that of air. Thus, the filling and emptying of the passage in which the debris detection is to take place causes changes in the passage contents electromagnetic characteristics, namely the passage contents dielectric constant and hence the passage electric displacement field, as affecting the behavior of any surrounding coil or resonator. In the inductive debris detection arrangements of the prior art that employ, as explained before, conventional multiturn coil configurations, this kind of fluid level variation produces coil or resonator performance changes which inherently result in false indications of debris presence. In contradistinction thereto, the employment of a large fixed and isolated capacitance in the arrangement constructed in accordance with the present invention results in the second of the aforementioned two advantages, namely that the characteristic behavior of the resonator is only insignificantly affected by these changes in the electric displacement field existing in the passage 11. The reduction of this effect in the arrangement of the present invention is of such a magnitude that a 0.007" diameter ferromagnetic sphere passing through the passage 11 having a 0.75" inner diameter produces a signal of a magnitude three times that of a noise signal produced by completely emptying and filling the passage 11 with a typical lubricant.

Thus, it may be seen that the achievement of the high Q factor means that, when the electric current supplied to the marginal portions 13 and 14 through the electric leads 17 and 18 alternates at such a frequency that the tank circuit operates at or close to resonance in the absence of any inclusions from the fluid present in the passage 11, any change in the characteristic response of the contents of the passage 11 caused, for instance, by the presence of metallic particles in the fluid flowing through the passage 11, introduces an imbalance into the operation of this tank circuit in a manner dependent on the electromagnetic properties of such inclusions. More particularly, metallic particles influence the electromagnetic field generated by the probe member 12 and thus the electric current flowing in the tank circuit differently, and to a much greater extent, than dielectric particles or other dielectric inclusions, and non-ferromagnetic metallic particles influence the electromagnetic field differently than ferromagnetic metallic particles, resulting in a different phase shift in each instance, while the magnitude of the change depends, by and large, on the size of the respective particle or inclusion. At the same time, however, the elongated single turn coil configuration of the probe member 12, coupled with the low L/C ratio employed in the tank circuit, results in a situation where the electric displacement field within the probe member 12 is as low as possible in relation to the electric field existing in the isolated, fixed capacitance region, so that air bubbles which are frequently encountered in lubricants will affect the operation of the aforementioned tank circuit only to an insignificant extent, if at all.

Figure 2:
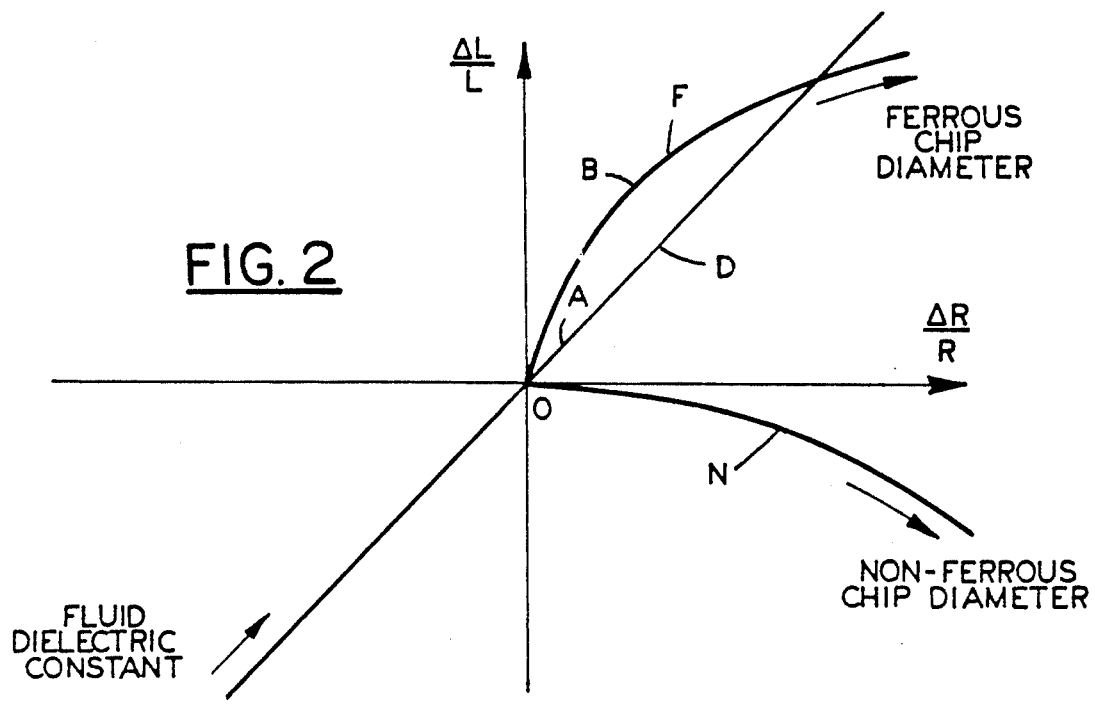
FIG. 2 is a graph depicting the response of the arrangement of FIG. 1 to various metallic and non-metallic inclusions entrained in the fluid flowing therethrough.

The phase shift response of the tank circuit that is constructed in accordance with the present invention to changes in the electromagnetic properties of the contents of the passage 11 is diagrammatically depicted in FIG. 2 of the drawing in which the point of origin O represents the conditions encountered when the passage 11 is filled with lubricating oil devoid of any inclusions. If the dielectric constant of the fluid present in or flowing through the passage 11 changes, which may occur, for instance, due to replacement of the original dielectric fluid by another dielectric fluid, both the relative resistivity ($\Delta R/R$) and the relative impedance ($\Delta L/L$) of the overall tank circuit (which includes the fluid present in the passage 11 in addition to the aforementioned tank circuit proper that is constituted by the probe member 12 and the capacitor arrangement 16) change generally to the same relatively small degree. This is indicated in FIG. 2 by the point A located on a straight line D, the distance OA being representative of the worst case scenario involving complete replacement of lubricating oil by air. It may be seen that the above distance is rather small. On the other hand, this distance would be much greater in an inductive debris detection system employing a conventional, multiturn coil.

On the other hand, when a ferromagnetic particle enters the internal passage 11 that is surrounded by the probe member 12, then both the relative impedance and the relative resistivity change in dependence on the size of the particle so as to be located on a curved line F which is applicable when the ferromagnetic particle is substantially spherical. As an example, point B of the curve F may be reached when the spherical ferromagnetic particle is about 7 mils in diameter, and the distance on the curve F from the point O will be lesser for smaller and greater for larger spherical ferromagnetic particles. For other shapes of the ferromagnetic particles, other curves akin to curve F and forming a family therewith apply, but all such curves are always located in the first quadrant of the graph depicted in FIG. 2. Thus, it may be seen that the values located in the first quadrant are indicative of the ferromagnetic character of the respective particle, and that the extent of deviation from the point O is indicative of the size of the respective ferromagnetic particle.

In contradistinction thereto, when the particle entering the internal passage 11 of the probe member 12 is metallic but non-ferromagnetic, the relative resistivity still changes in the positive sense, but the relative impedance changes in the negative sense, in accordance with the representative curve N of a curve family akin to that mentioned above with all curves of this family this time being always located in the fourth quadrant of the FIG. 2 graph, and the distance along the respective curve, such as N, being again indicative of the size of the respective metallic non-ferromagnetic particle. Thus, when it is determined that the value lies in the fourth quadrant, then the particle must be metallic and non-ferromagnetic, while the distance from the point of origin O gives the size of such particle.

Figure 3:
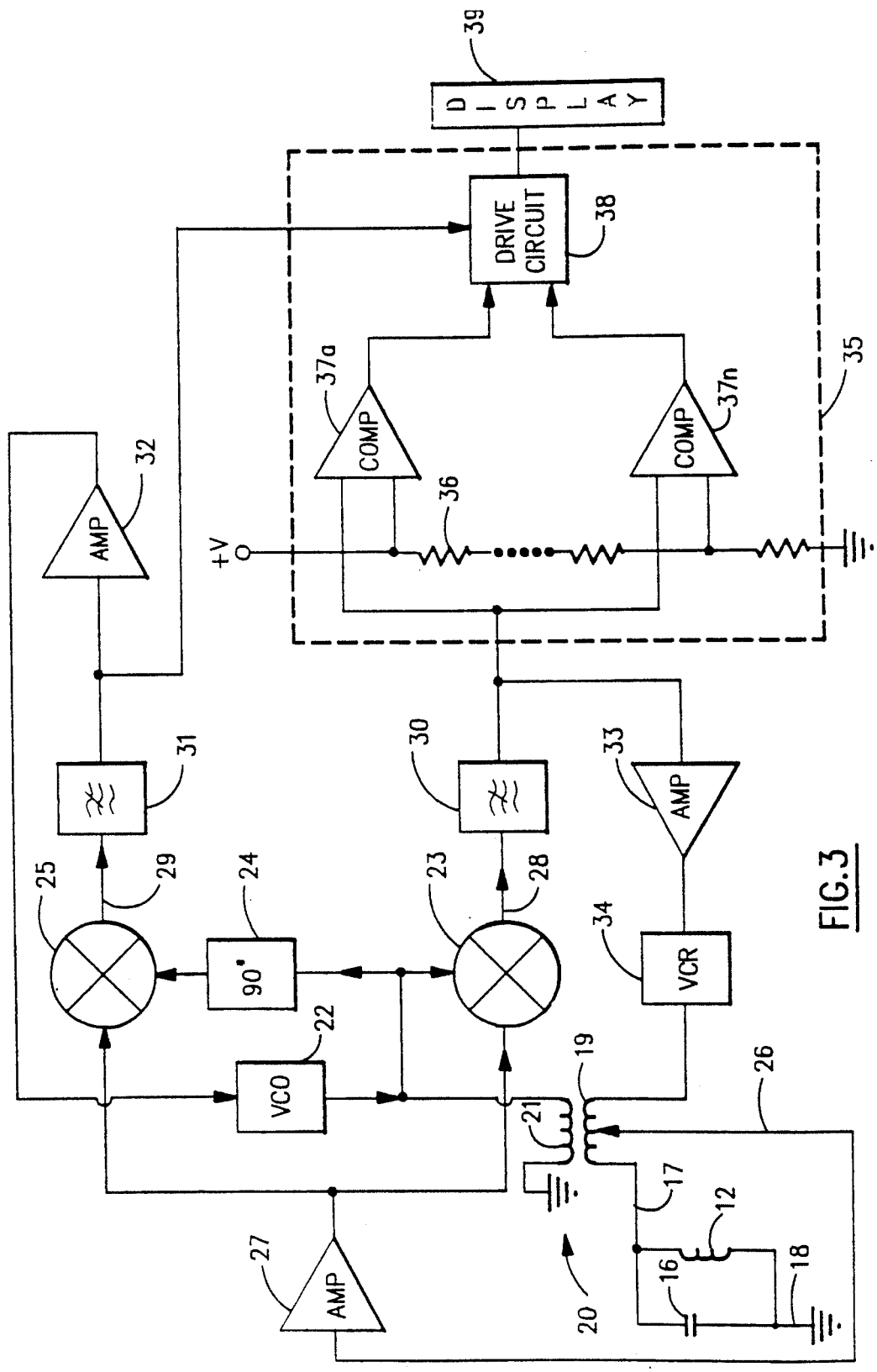
FIG. 3 is a simplified diagrammatic view of a circuit of the present invention capable of determining the character of any entrained metallic particle from the response of the arrangement of FIG. 1.

A circuit constructed in accordance with the present invention to gather and decipher the above information is presented in FIG. 3 of the drawing where the same reference numerals as before have been used to identify corresponding parts (i.e. their electrical equivalents). The lead 18 from the tank circuit 12 and 16 is shown to be grounded, while the lead 17 is connected to one end of one transformer winding 19 of a driving and pickup transformer 20. The transformer 20 further includes another transformer winding 21 whose one end is grounded while the other end thereof is supplied with an alternating electric current from a voltage controlled oscillator (VCO) 22. The alternating electromagnetic field generated by the other transformer winding 21 induces a correspondingly alternating electric current in the one transformer winding 19, and this latter electric current drives the tank circuit 12 and 16. The frequency of the alternating electric current issued by the oscillator VCO is such that the tank circuit 12 and 16 operates at or close to resonance.

The alternating electric current is also supplied directly to one input of a first mixer 23, and through a 90° phase shifter 24 to one input of a second mixer 25. A line 26 supplies an alternating electric current derived from the one coil 19 and thus representative of the alternating electric current flowing through the one coil 19 and thus into and out of the tank circuit 12 and 16 to a preamplifier 27 from where the amplified electric current is supplied to another input of the first mixer 23, as well as to another input of the second mixer 25, where the respective incoming alternating electric currents are mixed with one another, with the result that respective in-phase and quadrature error signals indicative of the difference between the output frequency of the VCO 22 and the resonant frequency of the tank circuit 12 and 16 appear at respective outputs 28 and 29 of the mixers 23 and 25. These error signals are then filtered by respective low-pass filters 30 and 31 to obtain respective resistive (in-phase) and reactive (quadrature) error signals.

The reactive error signal is supplied to a reactive error amplifier 32 which amplifies this reactive error signal, and this amplified reactive error signal is then supplied to an input of the VCO 22 which changes its operating (output) frequency in dependence on the magnitude of the amplified reactive error signal. Similarly, the resistive error signal is fed to an input of a resistive error amplifier 33 which amplifies this resistive error signal, and this amplified resistive error signal is then supplied to an input of a voltage controlled resistor (VCR) 34 which is interposed between the other end of the one transformer winding 19 and the ground and whose resistance varies in dependence on the magnitude of the amplified resistive error signal. The resistive and reactive error amplifiers 33 and 32 are constructed to operate with relatively large time constants, so that the resistance of the VCR 34 and the frequency of the VCO 22 change gradually in response to relatively long-term changes, especially those due to temperature variations, of the resonance characteristics of the tank circuit and/or of the characteristic properties of the contents of the passage 11. On the other hand, short-lived changes in such characteristic properties, such as those caused by the passage of individual metallic particles through the interior of the probe member 12, will leave the performance of the VCO 22 and of the VCR 34 virtually unaffected.

The output signals of the low-pass filters 30 and 31 are also supplied to an evaluating circuit 35 which is constructed to evaluate the reactive and resistive error signals to determine therefrom the character and size of any metallic particle then present in the passage 11. A quite simple exemplary implementation of the evaluating circuit 35 is shown in FIG. 3 of the drawing, but it is to be understood that the evaluating circuit 35 may have other configurations, depending on needs, or requirements for accuracy. The illustrated implementation of the evaluating circuit 35 incorporates a voltage divider 36 and a plurality of comparators 37a to 37n (n being any arbitrarily chosen integer) each of which has two inputs one of which is connected to an associated section of the voltage divider 36 while the other input is supplied with the filtered resistive error signal appearing at the output of the low-pass filter 30. Thus, the comparators 37a to 37n compare the filtered resistive error signal voltage with various reference voltage levels derived from the voltage divider 36, and that or those of the comparators 37a to 37n at which the filtered resistive error voltage exceeds the respective reference voltage issues an output signal or issue respective output signals which is or are then supplied to a drive circuit 38 of any known construction which drives a display 39. Furthermore, the filtered reactive error signal appearing at the output of the low-pass filter 32 is also supplied to the drive circuit 38 and is used to drive the display 39 accordingly.

It will be appreciated that, in the construction of the evaluating circuit 35 depicted in FIG. 3, the drive circuit 38 and the display 39 may be constructed in any well-known manner to present a numerical indication of the value of the resistive error signal which, as a reference to FIG. 2 will reveal, is indicative of the size of the respective metallic particle, whether such particle is ferromagnetic or non-ferromagnetic, and to present a simple, for instance on/off, indication of the sign of the reactive error signal to distinguish ferromagnetic metallic particles from non-ferromagnetic ones. However, it ought to be realized that it is also contemplated by the present invention to provide other constructions of the evaluating circuitry 35 and/or of the display 36, which present more sophisticated and/or more accurate results. So, for instance, the reactive and resistive error signals from the outputs of the filters 30 and 32 have been supplied to an oscillograph for recording thereat, and the thus recorded traces of the reactive and resistive error signals have been compared and evaluated in view of one another to determine both the size and the magnetic properties of respective particles. Of course, it is also contemplated to automate this cross-referencing procedure to determine the exact location of the response to the respective particle on the graph of FIG. 2 with attendant more precise determination of the characteristics (size, magnetic properties) of the respective particle.

Thus, it may be seen that the electric driving circuitry described above drives the resonator consisting of the probe member 12 and the capacitor arrangement 16 at or very close to resonance at all times. This makes the debris detection system highly sensitive to, and accurately indicative of, almost instantaneous or in any event quite short-lived perturbations in the resonator behavior (i.e. resonant frequency) as caused by metallic debris particles passing through the passage 11 of the probe member 12. On the other hand, there is provided automatic and continuous compensation for the effect of gradual changes, such as those accompanying temperature changes, aging of the system components, or the like, on the resonant frequency of the resonator. In essence, such short-lived perturbation detection and long-term change compensation is the result of the use and operation of the in-phase and quadrature detection and feedback arrangement which automatically nulls out a high frequency bridge circuit in response to long-term drifts in the resonant frequency and in the quality factor Q of the resonator, and which provides high sensitivity detection of transient changes caused by the passage of metallic debris particles through the passage 11. Experiments conducted with an actual implementation of the above-described detection system have demonstrated that such system provides reliable temperature compensation and excellent detection sensitivity over a wide range of temperatures (the range of between 15° and 120° C. having been actually tested). The output of this detection system or arrangement contains sufficient information in real time for detecting metallic particles, for discriminating between ferromagnetic and non-ferromagnetic debris, and for at least coarsely determining the sizes of the metallic debris particles.

While the present invention has been illustrated and described as embodied in a particular construction of a metallic particle detection arrangement, it will be appreciated that the present invention is not limited to this particular example; rather, the scope of protection of the present invention is to be determined solely from the attached claims.

What is claimed is:

1. A probe for use in detecting individual metallic particles carried by a fluid continuously flowing in an elongated passage and including an inductive coil surrounding the passage, characterized in that the inductive coil is electrically configured as a single-turn electric conductor which has a length as considered in the longitudinal direction of the passage that at least equals the diameter of the conductor and has a gap extending over the entire length of the conductor and physically separating two longitudinally extending portions of the conductor from one another; and capacitor means is situated directly at said gap, is electrically connected between said portions of said conductor and is isolated from the passage.

2. The probe according to claim 1, characterized in that the electric conductor and the capacitor means constitute a resonator circuit which has an inductance to capacitance ratio having a value of at most one to four.

3. An arrangement for detecting individual metallic particles carried by a fluid continuously flowing in an elongated passage and including an inductive coil surrounding the passage and supplied with alternating electric current by driving means, characterized in that the inductive coil is electrically configured as a single-turn electric conductor which has a length as considered in the longitudinal direction of the passage that at least equals the diameter of the conductor and has a gap extending over the entire length of the conductor and physically separating two longitudinally extending portions of the conductor from one another;

capacitor means is situated directly at said gap, is electrically connected between said portions of said conductor and is isolated from the passage;

control means so controls the driving means that the alternating current supplied thereby has a frequency substantially corresponding to the electric resonance frequency of an electric resonator constituted by the electric conductor and the capacitor means as influenced by the presence of inclusions in the fluid flowing through the passage, and issues error signals indicative of the extent of such control; and determining means determines the magnetic characteristics and sizes of metallic inclusions from the error signals issued by the control means and indicative of the influence of such inclusions on said resonance frequency.

4. An arrangement for detecting metallic particles carried by a fluid, comprising means for bounding at least one elongated passage for the flow of the fluid therethrough;

a metallic probe member stationary with respect to said bounding means and constituted by a split tube which extends around said passage and has two marginal portions delimiting a gap which extends along said passage and completely physically separates said marginal portions from one another;

capacitor means arranged at said gap and including at least two mutually facing capacitor surfaces each electrically connected with one of said marginal portions of said probe member, and at least one dielectric layer interposed between said capacitor surfaces;

means for causing alternating electric current to flow in said probe member around said passage between said two capacitor surfaces so that said probe member and said capacitor means form a tank circuit having resonance characteristics that are influenced by any inclusion then present in said passage in a manner dependent on the electromagnetic properties of said inclusion; and means for determining the character of at least any metallic particle then present in said passage from variations in said alternating electric current that reflect the influence of such metallic particle on said resonance characteristics.

5. The arrangement as defined in claim 4, wherein said capacitor means includes a plurality of individual capacitors distributed along said gap.

6. The arrangement as defined in claim 5, wherein said capacitors are chip capacitors.

7. The arrangement as defined in claim 4, wherein said marginal portions of said probe member overlap each other to constitute respective capacitor plates of said capacitor means; and wherein said capacitor means further includes at least one dielectric member interposed between said overlapping marginal portions.

8. The arrangement as defined in claim 4, wherein said marginal portions of said probe member overlap each other; and wherein said capacitor means is interposed between said overlapping marginal portions.

9. The arrangement as defined in claim 8, wherein said capacitor means includes a plurality of individual capacitors distributed along said gap.

10. The arrangement as defined in claim 9, wherein said capacitors are chip capacitors.

11. The arrangement as defined in claim 4, wherein said causing means includes means for applying an alternating electric excitation field to said probe member; and wherein said determining means includes means for mixing an alternating voltage of said alternating electric current separately in phase and in quadrature with alternating voltage representative of said alternating electric excitation field, respectively, to obtain respective resistive and reactive error signals when any metallic particle is present in said passage, and means for evaluating said resistive and reactive error signals to obtain therefrom information about the size and magnetic properties of such metallic particle.

12. The arrangement as defined in claim 11, wherein said applying means includes a voltage controlled oscillator having a control input; and further comprising reactive error feedback means for feeding said reactive error signal to said control input of said voltage controlled oscillator to control the frequency of the latter to follow that of said tank circuit.

13. The arrangement as defined in claim 12, and further comprising a voltage controlled resistor arranged in circuit with said probe member and having a control input, and resistive error feedback means for feeding said resistive error signal to said control input of said voltage controlled resistor to counteract changes in the effective resistance of said tank circuit.

14. An arrangement for detecting metallic particles carried by a fluid, comprising means for bounding at least one elongated passage for the flow of the fluid therethrough;

at least one metallic probe member stationary with respect to said bounding means and configured to extend around said passage and to minimize the electric field generated in said passage when electric current flows around said passage between two circumferentially spaced portions thereof;

capacitor means including at least two mutually facing capacitor surfaces each electrically connected with one of said portions of said probe member, and at least one dielectric layer interposed between said capacitor surfaces;

means for causing alternating electric current to flow in said probe member around said passage between said two portions and said two capacitor surfaces so that said probe member and said capacitor means form a tank circuit having resonance characteristics that are influenced by any inclusion then present in said passage in a manner dependent on the electromagnetic properties of said inclusion; and means for determining the character of at least any metallic particle then present in said passage from variations in said alternating electric current that reflect the influence of such metallic particle on said resonance characteristics.

* * * * *

UNITED STATES PATENT AND TRADEMARK OFFICE
CERTIFICATE OF CORRECTION

PATENT NO. : 5,041,856
DATED : August 20, 1991
INVENTOR(S) : WILLIAM A. VERONESI ET AL It is certified that error appears in the above-identified patent and that said Letters Patent is hereby corrected as shown below:

```
Column 5, line 12, following "through;" delete "and"

Column 5, line 64, "device 16" should read --device 16'--

Column 6, line 3, "FIGS. 1 and F" should read --FIGS. 1
                                                and 4--

Claim 3, column 11, line 40, following "resonator" insert
                                            --circuit--

Claim 4, column 12, line 7, following "character of" delete
                                            "at least"

Claim 14, column 14, line 5, following "character of"
                                delete "at least"
```

Signed and Sealed this

Ninth Day of November, 1993

Attest:

BRUCE LEHMAN

Attesting Officer

Commissioner of Patents and Trademarks